United States Patent
Teterwak

[19]

[11] Patent Number: 5,902,967
[45] Date of Patent: May 11, 1999

[54] METHOD AND APPARATUS FOR ELIMINATING AN OFFSET SIGNAL IN AN ELECTROSTATIC DIGITIZING TABLET

[75] Inventor: Jerzy A. Teterwak, Colorado Springs, Colo.

[73] Assignee: LSI Logic Corporation, Milpitas, Calif.

[21] Appl. No.: 08/599,609

[22] Filed: Feb. 9, 1996

[51] Int. Cl.[6] ................................................. G08C 21/00
[52] U.S. Cl. ............................... 178/18.01; 178/18.02; 178/18.03; 178/18.05; 178/18.06
[58] Field of Search ........................................ 345/173, 174, 345/175, 179, 182; 382/315; 178/18.01, 18.03, 18.04, 19.02, 19.04, 20.02, 20.03, 20.04, 18.05, 18.06

[56] References Cited

U.S. PATENT DOCUMENTS

| | | | |
|---|---|---|---|
| 4,334,124 | 6/1982 | Imsand et al. | 178/19 |
| 4,453,551 | 6/1984 | Anderson et al. | 128/704 |
| 4,728,944 | 3/1988 | Tamaru et al. | 340/706 |
| 4,831,566 | 5/1989 | Matthews et al. | 178/20 |
| 4,914,624 | 4/1990 | Dunthorn | 345/173 |
| 5,191,175 | 3/1993 | Protheroe et al. | 178/18 |
| 5,239,138 | 8/1993 | Kobayashi et al. | 178/18 |
| 5,251,123 | 10/1993 | Reiffel et al. | 364/167.01 |
| 5,359,156 | 10/1994 | Chan et al. | 178/19 |
| 5,402,151 | 3/1995 | Duwaer | 345/173 |
| 5,579,036 | 11/1996 | Yates, IV | 345/173 |
| 5,589,856 | 12/1996 | Stein et al. | 345/173 |
| 5,591,945 | 1/1997 | Kent | 178/18.04 |

FOREIGN PATENT DOCUMENTS

| 0283249 | 3/1988 | European Pat. Off. | G06K 11/06 |
|---|---|---|---|

OTHER PUBLICATIONS

Electronic Design; vol. 40, No. 22; Nov. 2, 1992; pp. 80–81, 84; XP000320266; D. Bursky; Chip Set Simplifies the Design of Pen–Based PCS.

*Primary Examiner*—Vijay Shankar
*Attorney, Agent, or Firm*—Wayne P. Bailey; Paul J. Maginot

[57] ABSTRACT

A method and apparatus for detecting when a second object touches a digitizing panel while a first object is touching the digitizing panel is disclosed. The method includes the steps of generating a first composite signal when the first object touches the digitizing panel, the composite signal including a first touch-down signal component and an offset signal component, converting the first composite signal to a first digital value indicative of an amplitude of the first composite signal, filtering the first digital value to filter out the offset signal component and to output the first touch-down signal component, generating a second composite signal when the second object touches the digitizing panel, the second composite signal including a second touch-down signal component and the first composite signal, converting the second composite signal to a second digital value indicative of an amplitude of the second composite signal, and filtering the second digital value to filter out the first composite signal and to output the second touch-down signal component.

24 Claims, 4 Drawing Sheets

```
10    float filter (float x)
20    {
30        static float x_buff[2];
40        static float y_buff[2];
50        float y;
60        y = 0.1539*x - 0.1539*x_buff[1] + 1.5761*y_buff[0] - 0.6921*y_buff[1];
70        x_buff[1] = x_buff[0];
80        x_buff[0] = x;
90        y_buff[1] = y_buff[0];
100       y_buff[0] = y;
110       return (y);
120   }
```

METHOD AND APPARATUS FOR ELIMINATING AN OFFSET SIGNAL IN AN ELECTROSTATIC DIGITIZING TABLET

BACKGROUND OF THE INVENTION

The present invention relates generally to digitizing tablets, and more particularly to a method and apparatus for eliminating an offset signal in an electrostatic digitizing tablet or panel associated with a computer.

Electrostatic digitizing panels having a resistive layer covered with a non-conductive plate such as glass, are known in the art. When operating in a touch mode, the corners of the resistive layer are typically stimulated with an AC signal so that when an object such as a user's finger touches the non-conductive plate, the finger capacitively couples to the resistive layer thereby causing current to flow in the corners of the resistive layer. The position of the user's finger relative to the digitizing panel can typically be determined by calculating a ratio of current flowing in each of the corners of the resistive layer.

One problem with the known electrostatic digitizing panels is their susceptibility to parasitic capacitance. In particular, metal components which are grounded to the system ground potential of the computer, surround the digitizing panel. The metal computer components can capacitively couple to the resistive layer of the digitizing panel which results in an AC (alternating current) offset signal or current flow through each of the corners of the resistive layer. The resulting AC offset current or signal is not stable and tends to vary with temperature, time, humidity etc. The AC offset signal may be comparable or even stronger than the signal level attributable to a user's finger.

In an idle state of the electrostatic digitizing panel (e.g. when a user's finger is not touching the non-conductive plate), the AC offset current flow in the corners of the resistive layer is due only to the capacitive loading caused by the surrounding metal computer components. The AC offset current is also present in an active state of the digitizing panel when a user's finger is touching the non-conductive layer. In the active state, the AC offset current disadvantageously adds to the current flow attributed to the user's finger which can cause errors in determining the position coordinates of the user's finger relative to the digitizing panel.

Thus, in order to accurately determine the position of a user's finger relative to the digitizing panel, the AC offset signal must be compensated for, or otherwise subtracted from the signal attributable to the user's finger. What is needed therefore is an electrostatic finger-sensitive digitizer that compensates for, or otherwise cancels an offset signal generated as a result of stray capacitive coupling between a resistive layer of a digitizing panel and grounded metal components of the computer.

SUMMARY OF THE INVENTION

In accordance with one embodiment of the present invention, there is provided a method for eliminating an offset signal in a digitizing panel. The method includes the steps of contacting the digitizing panel with an object so as to generate a composite signal having a touch-down component and an offset signal component, converting the composite signal to a digital value indicative of an amplitude of the composite signal, and filtering the digital value to filter out the offset signal component and to output the touch-down signal component to a signal line.

Pursuant to another embodiment of the present invention, there is provided a digitizing panel including a resistive layer having an offset signal component flowing therethrough, a mechanism for generating a composite signal when an object capacitively couples to the resistive layer wherein the composite signal includes a touch-down signal component and the offset signal component. The digitizing panel also includes a mechanism for converting the composite signal into a digital value indicative of an amplitude of the composite signal, and a mechanism for filtering the digital value to filter out the offset signal component and to output the touch-down signal component on a signal line.

Pursuant to another embodiment of the present invention, there is provided a method for detecting when a second object touches a digitizing panel while a first object is touching the digitizing panel is disclosed. The method includes the steps of generating a first composite signal when the first object touches the digitizing panel, the composite signal including a first touch-down signal component and an offset signal component, converting the first composite signal to a first digital value indicative of an amplitude of the first composite signal, filtering the first digital value to filter out the offset signal component and to output the first touch-down signal component, generating a second composite signal when the second object touches the digitizing panel, the second composite signal including a second touch-down signal component and the first composite signal, converting the second composite signal to a second digital value indicative of an amplitude of the second composite signal, and filtering the second digital value to filter out the first composite signal and to output the second touch-down signal component.

It is therefore an object of the present invention to provide a new and useful method for eliminating an offset signal in an electrostatic digitizing panel.

It is also an object of the present invention to provide an improved method for eliminating an offset signal in an electrostatic digitizing panel.

It is another object of the present invention to provide a new and useful digitizing panel for eliminating an offset signal in an electrostatic digitizing panel.

It is yet another object of the present invention to provide an improved digitizing panel for eliminating an offset signal in an electrostatic digitizing panel.

It is yet another object of this invention to provide a new and useful digitizing panel which eliminates the problems associated with fluctuating offset signal levels due to temperature, and humidity, etc.

It is yet another object of the present invention to provide a new and useful method for detecting when a second object touches a digitizing panel while a first object is touching the digitizing panel.

It is yet another object of the present invention is to provide a new and useful digitizer which enables a user to use more than one finger on a digitizing panel at the same time.

The above and other objects, features, and advantages of the present invention will become apparent from the following description and the attached drawings.

DETAILED DESCRIPTION OF THE PREFERRED EMBODIMENT

Figure 1:
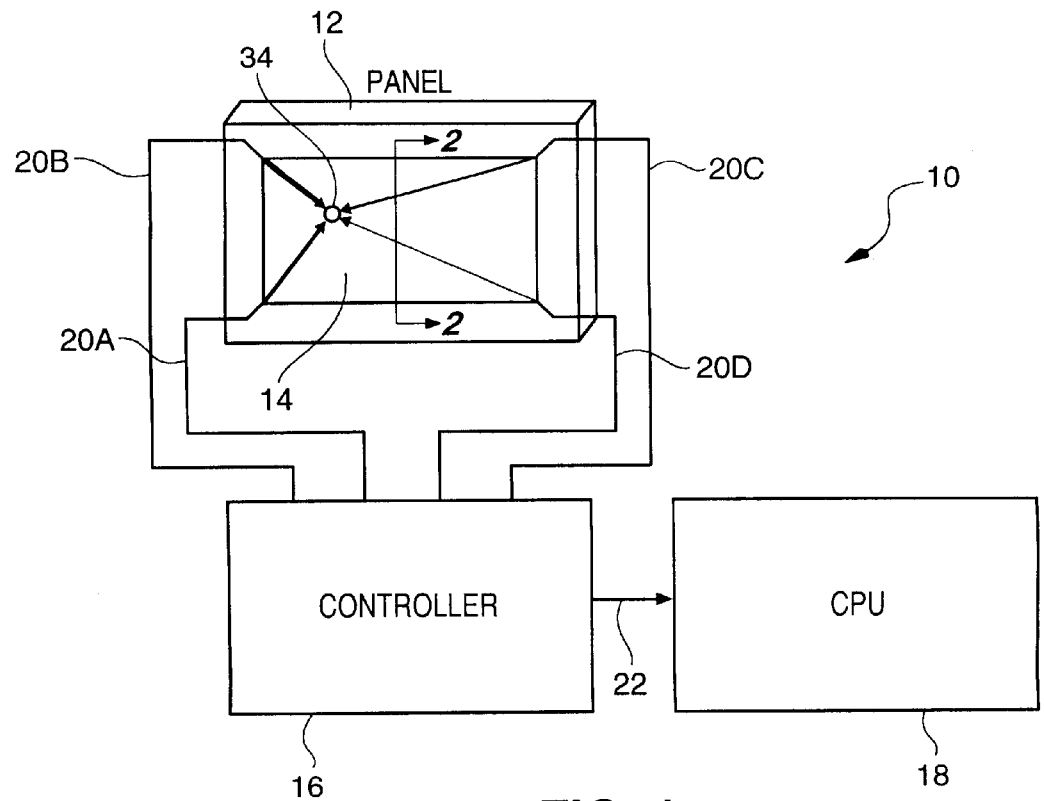
FIG. 1 is a functional block diagram of a computer which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a functional block diagram of a computer 10 such as a notebook or mobile computer which incorporates the features of the present invention therein. The computer 10 includes a base or frame 12, an electrostatic digitizing tablet or panel 14 secured to the frame 12, a controller 16, and a conventional Central Processing Unit (CPU) 18. The digitizing panel 14 is operatively connected to the controller 16 through corner wires 20a–20d, and the controller 16 is operatively connected to the CPU 18 through a serial data line 22 such as a serial port.

Figure 2:
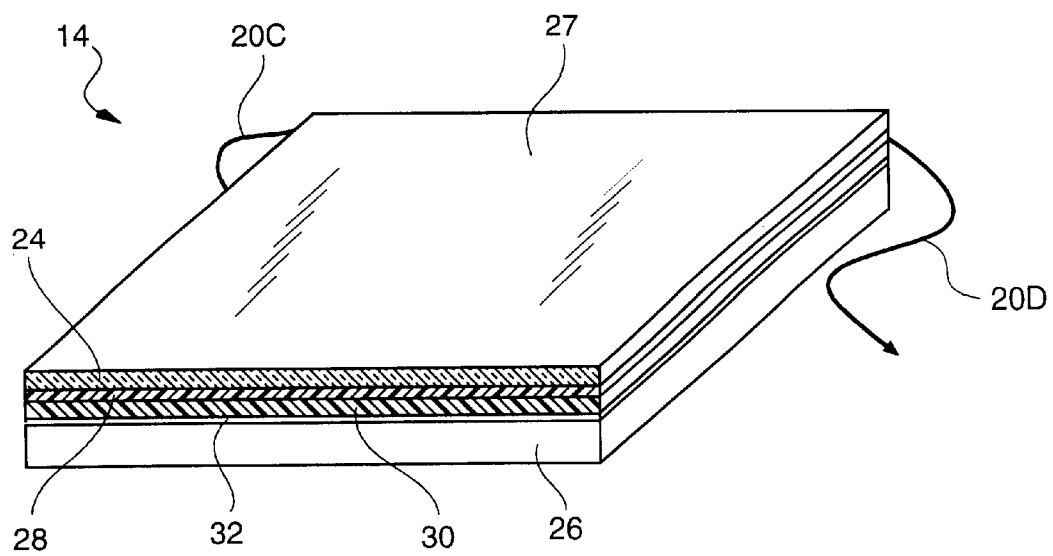
FIG. 2 is a perspective view of a digitizing panel of the computer taken along the line 2—2 in FIG. 1.

The electrostatic digitizing panel 14 may include several layers of known material as shown in FIG. 2. In the embodiment being described, a glass layer 24 protects an LCD (Liquid Crystal Display) screen 26 which is disposed below the glass layer 24. An upper surface 27 of the glass layer 24 defines a writing/touching surface for an object such as a hand-held stylus (not shown) or a user's finger (not shown). A lower surface of the glass layer 24 has a layer 28 of an active sensor material applied thereto. In the embodiment being described, the active sensor material is a thin coating of transparent indium-tin-oxide (ITO) which is typically used in electrostatic digitizing panel applications.

Each corner wire 20a–20d is electrically connected to a respective corner of the active ITO layer 28 for carrying current flow generated as a result of an object approaching, touching or withdrawing from the glass layer 24 as described further below. A polyester spall shield 30 is attached to the underside of the active ITO layer 28 to prevent the glass surface 24 from shattering if ever broken. A lower surface of the spall shield 30 may have an active ITO shield layer (not shown) applied thereto. The active ITO shield layer forms an electrical shield reducing noise coupling from the LCD screen 26 to the active ITO layer 28. An air gap 32 separates the lower surface of the spall shield 30 from an upper surface of the LCD screen 26.

The computer 10 may operate in one of two modes, namely a touch mode and a pen mode. In the pen mode, the computer 10 is conventionally configured so as to be receptive to a signal transmitted from a hand-held pen or stylus (not shown). In particular, a current flow is generated in each of the corner wires 20a–20d in response to the signal transmitted from the stylus. The controller 16 may determine a Cartesian coordinate (X, Y) position of the stylus relative to the digitizing panel 14, based on the current flow in each of the corner wires 20a–20d in a manner known to one of ordinary skill in the art. What follows hereafter is a description of the computer 10 while operating in the touch mode.

In touch mode, the active ITO layer 28 is biased with an AC signal from the controller 16. In particular, the controller 16 applies a 125 KHz biasing voltage to each corner of the active ITO layer 28 through the corner wires 20a–20d. While an object is not approaching the digitizing panel 14, the computer 10 is in a quiescent state and ideally, no current flows through the corner wires 20a–20d. However, it should be appreciated that a finite amount of AC offset current may flow through the corner wires 20a–20d in the quiescent state, due to loading effects caused by stray or parasitic capacitance between the active ITO layer 28 and any metal components of the computer 10 proximate the active ITO layer 28.

When an object does approach the digitizing panel 14, the object increasingly acts as a capacitive load that is coupled to the active ITO layer 28. More specifically, as the object moves closer to the active ITO layer 28, the capacitive coupling between the object and the active ITO layer 28 becomes greater. An object that is capacitively coupled to the active ITO layer 28 acts as a load on the active ITO layer 28 which results in current flow through each of the corners of the active ITO layer 28, and through the corner wires 20a–20d. As in the pen mode of operation, the controller 16 may determine a Cartesian coordinate (X, Y) position of an object such as a user's finger relative to the digitizing panel 14, based on the current flow in each of the corner wires 20a–20d in a manner known to one of ordinary skill in the art.

It should be appreciated that the object cannot directly contact the active ITO layer 28 due to the presence of the glass layer 24. The closest that an object can come to the active ITO layer 28 is by contacting the glass layer 24. The capacitive coupling between the object and the active ITO layer 28 is the greatest when the object contacts the glass layer 24.

The magnitude of current flow through each of the corners of the active ITO layer 28 (and in each of the corner wires 20a–20d) due to an object which is capacitively coupled to the active ITO layer 28, is proportional to the conductivity of the active ITO layer 28 between each corner of the active ITO layer 28 and the object at, for example, an object position 34 on the glass layer 24 as shown in FIG. 1. More particularly, the relative thickness of the arrows extending from the object position 34 to each corner of the active ITO layer 28, is indicative of the magnitude of current flow through the respective corners of the active ITO layer 28 due to the position of the object relative to the active ITO layer 28.

Thus, the closer the object is to a particular corner of the active ITO layer 28, the greater the conductivity of the active ITO layer 28 and the greater the current flow through that corner, as depicted by the relative thickness of lines extending between the object position 34 and each of the corners of the active ITO layer 28. Likewise, the farther the object is from a particular corner of the active ITO layer 28, the lower the conductivity of the active ITO layer 28, and the lower the current flow through that corner.

It should be appreciated that capacitive loading effects of an object vary from person to person, and for varying climate conditions. Thus, detecting when the touch of an object has occurred cannot be accurately determined based solely upon the magnitude of current flow measured at the four corners of the active ITO layer 28. That is, the magnitude of current flowing in each corner wire 20a–20d comprises two components which sum together to produce a resulting composite signal.

The first component is the current flow that is generated as a result of the parasitic capacitance of the metal computer components. The second component is the current flow that is generated at a result of the user's finger contacting the digitizing panel 14. Thus, if one were to determine the coordinate position of an object based upon the absolute value of the current flow in the corner wires 20a–20d, the resulting coordinate position would be skewed from the actual coordinate position of the object relative to the digitizing panel 14.

Figure 3:
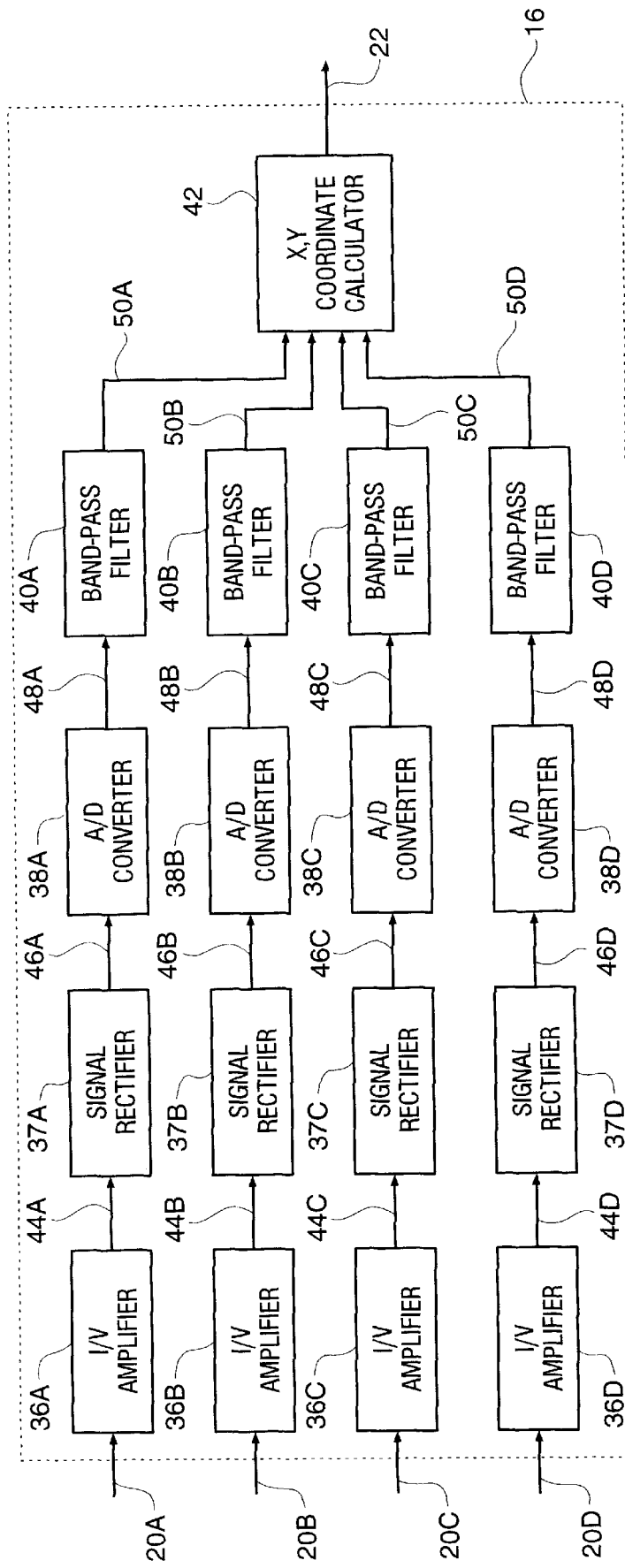
FIG. 3 is a block diagram of a controller shown in FIG. 1.

Referring now to FIG. 3, there is shown a simplified functional block diagram of the controller 16. In particular, the controller 16 includes a number of current-to-voltage (I/V) amplifiers 36a–36d, signal rectifiers 37a–37d, analog-to-digital (A/D) converters 38a–38d, and band-pass filters 40a–40d, each of which are associated with a respective corner wire 20a–20d. The controller 16 also includes an X, Y coordinate calculator 42.

Each of the I/V amplifiers 36a–36d has two functions. The first function is to conventionally supply the 125 KHz AC signal to the respective corner wires 20a–20d for stimulating the active ITO sensor layer 28 when the computer 10 is in the touch mode of operation. The second function is to conventionally produce AC output signals on lines 44a–44d which have voltage levels indicative of the magnitude of current flowing through the respective corner wires 20a–20d.

The signal rectifiers 37a–37d convert the AC signals on lines 44a–44d to DC (direct current) output signals on lines 46a–46d in a conventional manner. As with the current flow on lines 20a–20d, the DC signals on lines 46a–46d each include a first amplitude component that is attributable to the parasitic capacitance of the metal computer components, and a second amplitude component that is attributable to the user's finger when contacting the digitizing panel 14. Thus, when an object that is touching the digitizing panel 14 is moved relative to the digitizing panel 14, the levels of the DC signals on lines 46a–46d will vary due to the change in conductivity of the active ITO layer 28 between each corner of the active ITO layer 28 and the instantaneous position of the object relative to the digitizing panel 14. It should be appreciated that the AC output signals on lines 44a–44d may be conventionally filtered in a 125 KHz band-pass filter (not shown) prior to being rectified by the rectifiers 37a–37d. The purpose of the 125 KHz band pass filters is to selectively pass the useful 125 KHz signal and reject other unwanted noise components of different frequencies.

The A/D converters 38a–38d conventionally convert the DC signals on lines 46a–46d into digital (binary) values which are indicative of the levels of the DC signals. In particular, the A/D converters 38a–38d periodically sample the DC signals on lines 46a–46d to convert the respective DC signals into digital values on lines 48a–48d. The digital values on line 48a–48d are then filtered by the band-pass filters 40a–40d as described further below.

The I/V amplifiers 36a–36d, signal rectifiers 37a–37d, and A/D converters 38a–38d are conventionally implemented in hardware. In addition, the I/V amplifiers 36a–36d, signal rectifiers 37a–37d, and A/D converters 38a–38d each operate in a manner known to one of ordinary skill in the art, and further detailed discussion thereof is not necessary for a complete understanding of the present invention.

The band-pass filters 40a–40d perform two functions. The first function is to cut off any DC signal components in order to make subsequent coordinate determinations independent of the offset signal level. That is, the band-pass filters 40a–40d filter out the signal component that is attributable to the parasitic capacitance of the metal computer components so that coordinate determinations can be based solely upon the signal component that is attributable to the user's finger when contacting the digitizing panel 14. The second function of the band-pass filters 40a–40d is to filter out high frequency noise components in order to increase the resolution of the digitizing panel 14.

In particular, the resolution of the digitizing panel 14 is the ability to distinguish between two close positions of an object contacting the digitizing panel 14. The resolution of the digitizing panel 14 is directly related to the noise in the system. The noise causes the position reported from numerous touch-downs, placed at the same location on the digitizing panel, to vary from one touch-down to the next. The amount of variance in the reported positions determines system resolution. As described further below, band-pass filtering improves the system resolution by attenuating the noise and interference signal components which couple to the input of the system but which are not in the bandwidth of the useful signal.

The band-pass filters 40a–40d are implemented as second order digital band-pass filters having upper and lower cut-off frequencies of less than approximately 20 Hz. In the embodiment being described, the upper and lower cut-off frequencies are optimally selected at approximately 3 Hz. The band-pass filters 40a–40d have a transfer function (in the Z-transform domain) as shown by equation (1):

$$H(z) = \frac{0.1539 - 0.1539z^{-2}}{1 - 1.5761z^{-1} + 0.6921z^{-2}} \quad (1)$$

Figures 4, 5:
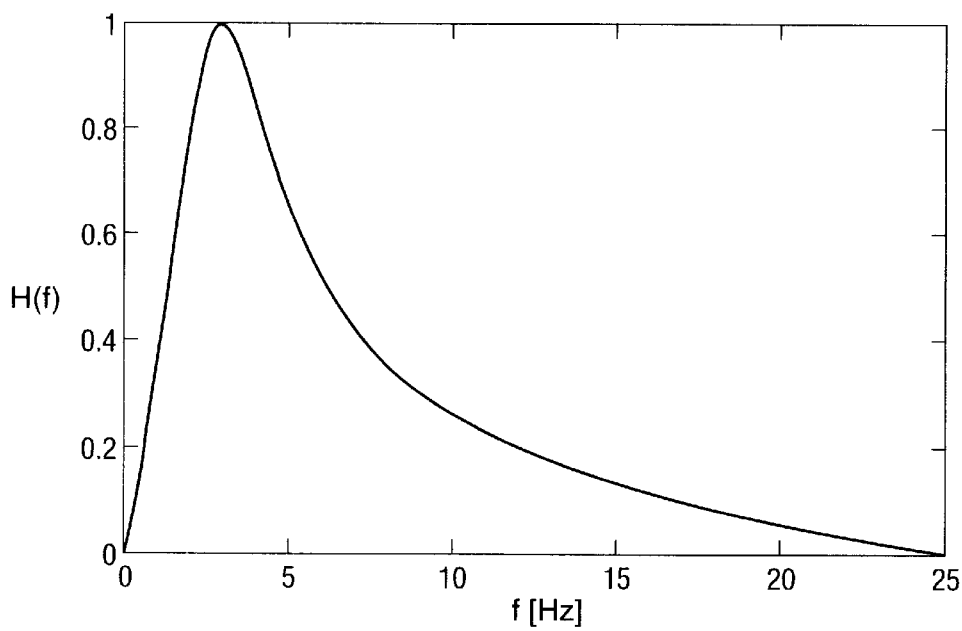
FIG. 4 is a graph showing a frequency response curve for a band-pass filter of the controller shown in FIG. 3.
FIG. 5 is a pseudo-code listing which implements a band-pass filter of the controller shown in FIG. 3.

Equation (1) corresponds with the frequency response graph shown in FIG. 4. In particular, FIG. 4 shows a graph of the amplitude of the output signals from the band-pass filters 40a–40d vs. frequency where the input signals to the band-pass filters 40a–40d are assumed to have an amplitude equal to 1.0. That is, the graph shows a ratio of the output and input amplitudes where $|\underline{H}(f)|$ is the module of the transfer function of equation (1). Thus, the graph shows only the relationship between the input and output amplitudes and does not show their phase relationship.

It should be appreciated that the upper and lower cut-off frequencies of the band-pass filters 40a–40d may be user-selectable and depend upon the particular system design. Further, the coefficient values set forth in equation (1) correspond with the bandwidth of 3 Hz and may be different if the bandwidth is changed. However, the structure of equation (1) will remain the same.

In the embodiment being described, the band-pass filters 40a–40d are implemented in firmware. However, it should be appreciated that a band-pass filter having the same transfer function as equation (1) could be implemented in hardware if so desired. The transfer function shown in equation (1) produces, or otherwise results in, the recursive formula shown in equation (2):

$$Y_n = 0.1539X_n - 0.1539X_{n-2} + 1.5761Y_{n-1} - 0.6921Y_{n-2} \quad (2)$$

where $Y_n$ is the nth output value of the band pass filters 40a–40d and $X_n$ is the nth input value for the band-pass filters 40a–40d. According to equation (2), the present filter output value ($Y_n$) is determined based on the present input value ($X_n$), the second previous input value ($X_{n-2}$), the previous output value ($Y_{n-1}$) and the second previous output value ($Y_{n-2}$).

Referring now to FIG. 5, there is shown an exemplary software routine for implementing equation (2). The software routine returns a band-pass filter output value (y). The parameter (x) is the present input value from an A/D converter 38a–38d. In order to obtain a sequence of filter output values, the routine must be executed once for each value in the sequence.

As shown in FIG. 5, two arrays (x_buff) and (y_buff) are defined in lines 30 and 40 for storing previous band-pass filter input and output values. The variable (y) is defined in line 50 for storing the filter output value calculated during the present iteration of the routine. The present filter output value (y) is determined from equation (2) in line 60. The previous filter input value stored in x_buff[0] is shifted to x_buff[1], and the present filter input value (x) is shifted into x_buff[0] in lines 70 and 80. The previous filter output value stored in y_buff[0] is shifted to y_buff[1], and the present filter output value (y) is shifted into y_buff[0] in lines 90 and 100. The present filter output value (y) is returned in line 110.

In applications where the computer 10 is operating in touch mode, and a keyboard is being emulated on the display screen 26, the band-pass filters 40a–40d permit the computer 10 to detect or otherwise discriminate between two independent finger touches. For example, if a user desires to touch a shift key being emulated on the display screen 26, and then while still touching the shift key, touch a second key being emulated on the display screen 26, the computer 10 can determine the coordinate positions of the first and second touches.

Figure 6:
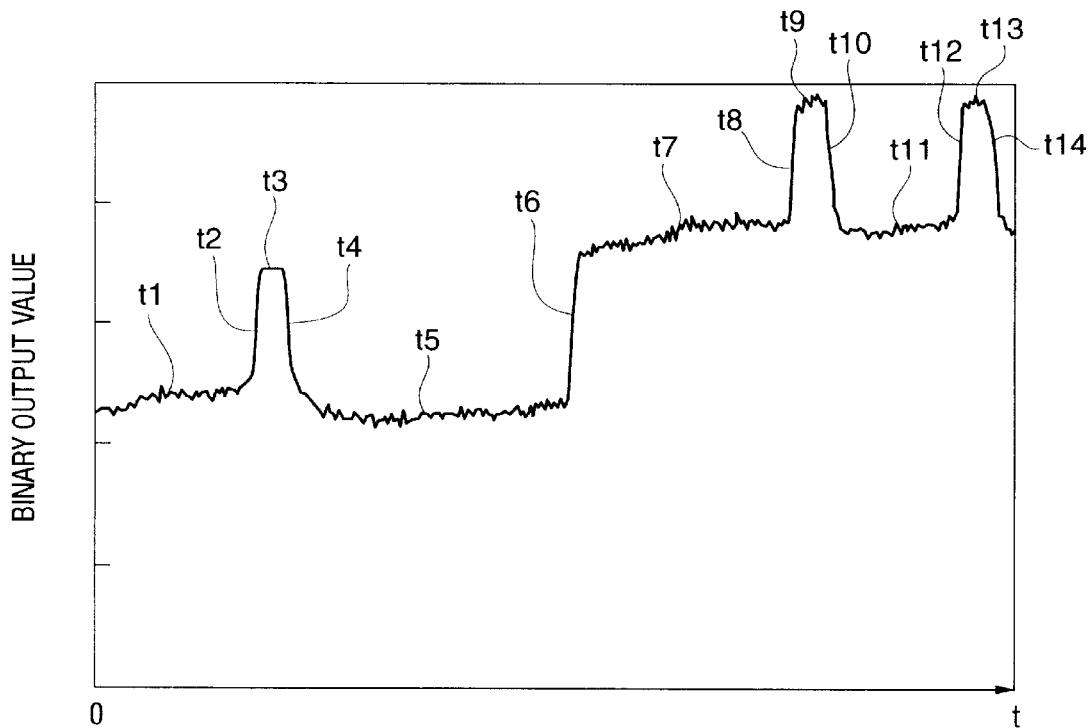
FIG. 6 is a graph of a corner signal prior to being band-pass filtered in the controller shown in FIG. 3.

FIG. 6 is a graph showing unfiltered binary output data from one of the A/D converters 38a–38d (FIG. 3) versus time. In particular, FIG. 6 shows the unfiltered output data from an AND converter 38a–38d at a time $t_1$ prior to an object contacting the digitizing panel 14. A user's first finger (not shown) contacts the digitizing panel at $t_2$ and remains in contact with the digitizing panel at $t_3$. The user's first finger is withdrawn from the digitizing panel at $t_4$, and nothing is contacting the digitizing panel at $t_5$. The user's first finger contacts the digitizing panel again at $t_6$, and remains in contact with the digitizing panel at $t_7$. The user's second finger (not shown) contacts the digitizing panel at $t_8$ and remains in contact with the digitizing panel at $t_9$. The user's second finger is withdrawn from the digitizing panel at $t_{10}$ leaving only the user's first finger in contact with the digitizing panel at $t_{11}$. The user's second finger again contacts and then withdraws from the digitizing panel at $t_{12}$–$t_{14}$ while the user's first finger remains in contact with the digitizing panel.

The unfiltered output data from the A/D converter 38a–38d at $t_1$ is solely attributable to the offset signal generated as a result of the metal components which are capacitively coupled to the active ITO layer 28 as described above. When the user's first finger contacts the digitizing panel at $t_2$, the user's first finger capacitively couples to the active ITO layer 28 resulting in an increase in current flow through the corner wires 20a–20d. The additional current flow results in a higher digital value for the unfiltered output data from the A/D converters 38a–38d as shown at T3.

If an object that is contacting the digitizing panel 14 is not moved relative to the digitizing panel 14, then the unfiltered output data from the A/D converters 38a–38d remains constant at a particular level as shown at $t_3$. However, if the object is moved relative to the digitizing panel 14 while the object remains in contact with the digitizing panel 14, then the unfiltered output data level at $t_3$ will gradually increase or decrease depending upon the movement of the object relative to the particular corner of the active ITO layer 28. The change in the unfiltered output data level at $t_3$ is attributable to the change in conductivity of the active ITO layer 28 as described above.

When the object is withdrawn from the digitizing panel at $t_4$, the additional current flow generated as a result of the capacitive coupling between the object and the active IT0 layer 28 decreases to zero resulting in a return to the unfiltered output data value at $t_5$ which is solely attributable to the offset signal component.

The user's first finger contacts the digitizing panel again at $t_6$ and remains in contact with the digitizing panel at $t_7$. When the user's second finger (not shown) contacts the digitizing panel at $t_8$ while the user's first finger is still in contact the digitizing panel, then additional current will flow in the corner wires 20a–20d which results in an unfiltered output data value at $t_9$. It should be appreciated that the unfiltered output data level at $t_9$ is indicative of the sum of signal components attributable to the offset signal, the user's first finger and the user's second finger.

In the case where a keyboard is emulated on the display screen 26, and a user touches a first key on the digitizing panel 14 with a first finger, and while still touching the first key, independently touches a second key on the digitizing panel with a second finger, the computer 10 cannot determine the coordinate positions of the first and second finger touches based on the unfiltered output data from the A/D converters 38a–38d. This is because the absolute value of the unfiltered output data at T9 comprises three components, namely an offset signal component, a first finger component and a second finger component each which cannot be resolved back into separate components.

Figure 7:
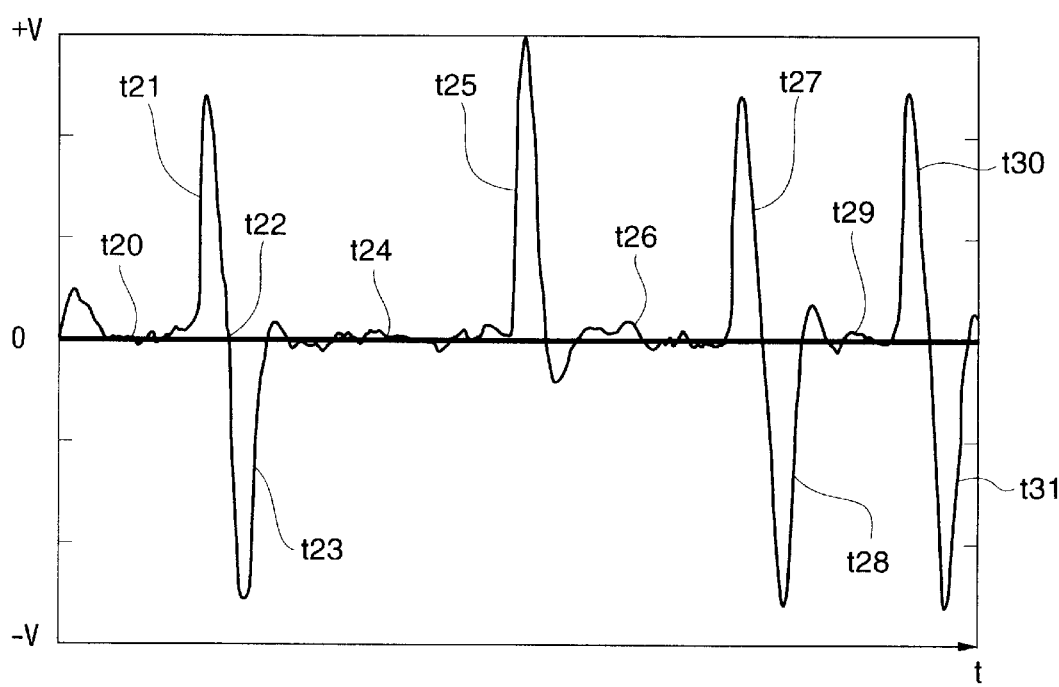
FIG. 7 is a graph of a corner signal after being band-pass filtered in the controller shown in FIG. 3.

The unfiltered output data shown in FIG. 6 is band-pass filtered by the band-pass filters 40a–40d which results in the filtered output data on lines 50a–50d (FIG. 3) as shown in FIG. 7. In particular, FIG. 7 shows the filtered output data from a band-pass filter 40a–40d at a time $t_{20}$ prior to an object contacting the digitizing panel 14. A user's first finger (not shown) contacts the digitizing panel at $t_{21}$ and remains in contact with the digitizing panel at $t_{22}$. The user's first finger is withdrawn from the digitizing panel at $t_{23}$, and nothing is contacting the digitizing panel at $t_{24}$. The user's first finger contacts the digitizing panel again at $t_{25}$, and remains in contact with the digitizing panel at $t_{26}$. The user's second finger (not shown) contacts the digitizing panel at $t_{27}$. The user's second finger is withdrawn from the digitizing panel at $t_{28}$ leaving only the user's first finger in contact with the digitizing panel at $t_{29}$. The user's second finger again contacts and then withdraws from the digitizing panel at $t_{30}$ and $t_{31}$, respectively, while the user's first finger remains in contact with the digitizing panel.

As mentioned above, the band-pass filters 40a–40d filter out any DC signal components (which may include slowly changing signal components that are attributable to an object that is moved relative to the digitizing panel while that object remains in contact with the digitizing panel) of the unfiltered output data from the A/D converters 38a–38d in order to make subsequent coordinate determinations independent of the offset signal level. Thus, the offset signal component of the unfiltered output data at $t_1$ is attenuated by the band-pass filters 40a–40d resulting in a substantially zero output level at $t_{20}$. The attenuation of the offset signal component occurs because the band-pass filters 40a–40d operate to cut off any DC and slowly changing signal components.

When an object contacts the digitizing panel 14, the band-pass filters 40a–40d provide filtered output data at $t_{21}$ which is proportional to the change in the unfiltered output data at $t_2$. That is, the band-pass filters 40a–40d pass rapidly changing components of the unfiltered output data at $t_2$. As mentioned above, as long as the object remains in contact with the digitizing panel 14 then the unfiltered output data from the A/D converters 38a–38d will remain constant at a particular level as shown at $t_3$ (FIG. 6), or at most, gradually increase or decrease (i.e. slowly changing) depending upon the movement of the object relative to the digitizing panel 14. Thus, the constant or gradually increasing or decreasing unfiltered output data at $t_3$ will be filtered out by the band-pass filters 40a–40d resulting in a zero output level at $t_{22}$.

When the object is removed from the digitizing panel, the level of the unfiltered output data decreases, and the band-pass filters 40a–40d provide filtered output data at $t_{23}$ which is proportional to the change in the unfiltered output data at $t_4$. With the object removed from the digitizing panel, the unfiltered output data at $t_5$ is attributable solely of the offset signal component which is filtered out by the band-pass filters 40a–40d resulting in a zero output level at $t_{24}$.

In the case where a keyboard is emulated on the display screen 26, and a user touches a first key on the digitizing panel 14 with a first finger, and while still touching the first key, independently touches a second key on the digitizing panel 14 with a second finger, the computer 10 can determine the coordinate positions of the first and second touches based on the filtered output data on lines 50a–50d from the band-pass filters 40a–40d.

In particular, if a user touches a first key on the digitizing panel 14 with a first finger, the output from the band-pass filters 40a–40d at $t_{25}$ will be proportional to the change in the unfiltered output data at $t_6$. With the user's first finger remaining in contact with the digitizing panel, the output of the band-pass filters 40a–40d drops to zero at $t_{26}$ because the band-pass filters 40a–40d operate to cut off any DC and slowly changing signal components such as the unfiltered output data at $t_7$.

When the user touches a second key on the digitizing panel 14 with a second finger while still touching the first key with the first finger, the band-pass filters 40a–40d provide filtered output data at $t_{27}$ which is proportional to the change in the unfiltered output data at $t_8$. Likewise, when the user removes the second finger from the second key while still touching the first key with the first finger, the band-pass filters 40a–40d provide filtered output data $t_{28}$ which is proportional to the change in the unfiltered output data at $t_{10}$.

With the user's first finger remaining in contact with the digitizing panel, the output of the band-pass filters 40a–40d drops to zero at $t_{29}$ because the band-pass filters 40a–40d operate to cut off any DC and slowly changing signal components such as the unfiltered output data at $t_{11}$. The user's second finger again contacts and then withdraws from the digitizing panel at $t_{30}$ and $t_{31}$ while the user's first finger remains in contact with the digitizing panel.

It should be appreciated that by band-pass filtering the digital output data from the A/D converters 38a–38d, the X, Y coordinate calculator 42 can determine the position coordinates of one or more objects simultaneously contacting the digitizing panel 14. In addition, by band-pass filtering the digital output data from the A/D converters 38a–38d, only the signal components attributable to the object or objects contacting the digitizing panel are passed to the X, Y coordinate calculator 42 on lines 50a–50d, while the signal component attributable to the offset signal is effectively removed.

The X, Y coordinate calculator 42 determines the coordinate position of one or more objects that are contacting the digitizing panel based on the amplitude of the pulses present on lines 50a–50d in a manner known to one of ordinary skill in the art. The X, Y coordinates that are calculated by the X, Y coordinate calculator 42 are passed to the CPU 18 for conventional processing.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

It should be appreciated that the band-pass filters 40a–40d could be replaced with high-pass filters in order to filter out any DC and slowly changing signal components. However, high-pass filters alone could not filter out any high frequency noise or interference components that are present in the unfiltered output data from the A/D converters 38a–38d.

What is claimed is:

1. A method for eliminating an offset signal in a digitizing panel, comprising the steps of:

contacting the digitizing panel with an object so as to generate a composite signal having an offset signal component and a touch-down signal component indicative of position of the object relative to the digitizing panel;

converting the composite signal to a direct current (DC) signal indicative of the composite signal; and filtering the DC signal to filter out the offset signal component and to output the touch-down signal component to a signal line.

2. The method of claim 1, wherein the filtering step includes the step of:

passing the DC signal through a band-pass filter to filter out the offset signal component and to output the touch-down signal component.

3. The method of claim 2, wherein the band-pass filter is implemented as a second order band-pass filter.

4. The method of claim 1, wherein:

the converting step includes the step of generating a plurality of digital values to represent the DC signal, and the filtering step includes the step of passing the plurality of digital values through a second order digital band-pass filter.

5. The method of claim 2, wherein the band-pass filter has an upper cut-off frequency and a lower cut-off frequency set to frequencies less than approximately 20 Hz.

6. The method of claim 2, wherein the band-pass filter has a transfer function of approximately:

$$H(z) = \frac{0.1539 - 0.1539z^{-2}}{1 - 1.5761z^{-1} + 0.6921z^{-2}}.$$

7. The method of claim 1, further including the step of amplifying the composite signal with a current-to-voltage amplifier, wherein:

the converting step includes the step of rectifying the amplified composite signal in order to obtain the DC signal.

8. The method of claim 1, wherein the contacting step includes the step of:

generating the touch-down signal component when a finger contacts the digitizing panel.

9. A digitizing panel comprising:

a resistive layer having an offset signal component flowing therethrough;

means for generating a composite signal when an object capacitively couples to said resistive layer, said composite signal including the offset signal component and a touch-down signal component indicative of position of said object relative to said resistive layer;

means for converting said composite signal into a direct current (DC) signal indicative of said composite signal; and means for filtering said DC signal to filter out said offset signal component and to output said touch-down signal component on a signal line.

10. The digitizing panel of claim 9, wherein said means for filtering includes a band-pass filter for filtering out said offset signal component and outputting said touch-down signal component on said signal line.

11. The digitizing panel of claim 10, wherein the band-pass filter is a second order band-pass filter.

12. The digitizing panel of claim 10, wherein the band-pass filter is a second order digital band-pass filter.

13. The digitizing panel of claim 10, wherein said band-pass filter has an upper cut-off frequency and a lower cut-off frequency set to frequencies less than approximately 20 Hz.

14. The digitizing panel of claim 10, wherein said band-pass filter has a transfer function of approximately:

$$H(z) = \frac{0.1539 - 0.1539z^{-2}}{1 - 1.5761z^{-1} + 0.6921z^{-2}}.$$

15. The digitizing panel of claim 9, further including:

a signal rectifier coupled to said signal converting means; and a current-to-voltage amplifier coupled to said signal rectifier.

16. The digitizing panel of claim 9, wherein the object is a finger.

17. A method for determining position of a second object relative to a digitizing panel while a first object is touching the digitizing panel, comprising the steps of:

generating a first composite signal when the first object touches the digitizing panel, the composite signal including an offset signal component and a first touch down signal component indicative of position of the first object relative to the digitizing panel;

converting the first composite signal to a first direct current (DC) signal indicative of the first composite signal;

filtering the first DC signal to filter out the offset signal component and to output the first touch-down signal component;

generating a second composite signal when the second object touches the digitizing panel while the first object continues to touch the digitizing panel, the second composite signal including the first composite signal and a second touch-down signal component indicative of position of the second object relative to the digitizing panel;

converting the second composite signal to a second DC signal indicative of the second composite signal; and filtering the second DC signal to filter out the first composite signal and to output the second touch-down signal component.

18. The method of claim 17, wherein the first DC signal filtering step includes the step of filtering the first DC signal with a band-pass filter; and wherein the second DC signal filtering step includes the step of filtering the second DC signal with the band-pass filter.

19. The method of claim 18, wherein the band-pass filter is a second order band-pass filter.

20. The method of claim 19, wherein the band-pass filter is a second order digital band-pass filter.

21. The method of claim 18, wherein the band-pass filter has an upper cut-off frequency and a lower cut-off frequency set to frequencies less than approximately 20 Hz.

22. The method of claim 18, wherein the band-pass filter has a transfer function of approximately:

$$H(z) = \frac{0.1539 - 0.1539z^{-2}}{1 - 1.5761z^{-1} + 0.6921z^{-2}}.$$

23. The method of claim 17, further including the steps of (1) amplifying the first composite signal with a current-to-voltage amplifier, and (2) amplifying the second composite signal with the current-to-voltage amplifier, wherein:

the first composite signal converting step includes the step of rectifying the amplified first composite signal, and the second composite signal converting step includes the step of rectifying the amplified second composite signal.

24. The method of claim 17, wherein the first object is a first finger and the second object is a second finger.

* * * * *